United States Patent
Lyren

(10) Patent No.: US 10,602,295 B2
(45) Date of Patent: *Mar. 24, 2020

(54) METHOD TO EXPEDITE PLAYING OF BINAURAL SOUND TO A LISTENER

(71) Applicant: Philip Scott Lyren, Bangkok (TH)

(72) Inventor: Philip Scott Lyren, Bangkok (TH)

(*) Notice: Subject to any disclaimer, the term of this patent is extended or adjusted under 35 U.S.C. 154(b) by 0 days.

This patent is subject to a terminal disclaimer.

(21) Appl. No.: 16/510,920

(22) Filed: Jul. 14, 2019

(65) Prior Publication Data

US 2019/0342690 A1  Nov. 7, 2019

Related U.S. Application Data

(63) Continuation of application No. 15/921,688, filed on Mar. 15, 2018, now Pat. No. 10,469,974.

(51) Int. Cl.
| | | |
|---|---|---|
| H04R 5/02 | (2006.01) | |
| H04S 7/00 | (2006.01) | |
| H04S 5/00 | (2006.01) | |
| H04M 1/725 | (2006.01) | |

(52) U.S. Cl.
CPC ............. *H04S 7/302* (2013.01); *H04S 5/00* (2013.01); *H04M 1/72522* (2013.01); *H04S 2420/01* (2013.01)

(58) Field of Classification Search
CPC ....... H04S 7/302; H04S 5/00; H04M 1/72522
USPC ........... 381/17, 22, 23, 310; 379/93.21, 158, 379/202.01, 204.01
See application file for complete search history.

(56) References Cited

U.S. PATENT DOCUMENTS

| | | | | |
|---|---|---|---|---|
| 5,596,644 A | * | 1/1997 | Abel | H04S 3/002 381/17 |
| 7,483,400 B2 | * | 1/2009 | Kuusinen | H04L 12/1822 370/261 |
| 2009/0122995 A1 | * | 5/2009 | Kim | G10L 21/028 381/17 |
| 2013/0041648 A1 | * | 2/2013 | Osman | H04S 7/304 704/2 |
| 2015/0124975 A1 | * | 5/2015 | Pontoppidan | H04R 25/552 381/23.1 |
| 2015/0189455 A1 | * | 7/2015 | Donaldson | H04R 1/20 381/77 |
| 2015/0304790 A1 | * | 10/2015 | Yamashita | G06F 21/32 381/303 |
| 2015/0326963 A1 | * | 11/2015 | Sorensen | H04R 1/1041 381/74 |
| 2015/0373477 A1 | * | 12/2015 | Norris | H04R 5/04 381/303 |
| 2015/0382127 A1 | * | 12/2015 | Sun | H04S 7/30 381/17 |

* cited by examiner

*Primary Examiner* — William J Deane, Jr.

(57) ABSTRACT

A method expedites processing and playing of binaural sound during an electronic communication between a first user and a second user. An electronic device of the first user convolves sound into binaural sound for the second user before the binaural sound transmits to the electronic device of the second user. In this way, the binaural sound is already convolved and ready to play upon receipt at the electronic device of the second user.

20 Claims, 5 Drawing Sheets

METHOD TO EXPEDITE PLAYING OF BINAURAL SOUND TO A LISTENER

BACKGROUND

Three-dimensional (3D) sound localization offers people a wealth of new technological avenues to not merely communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

SUMMARY

Figure 1:
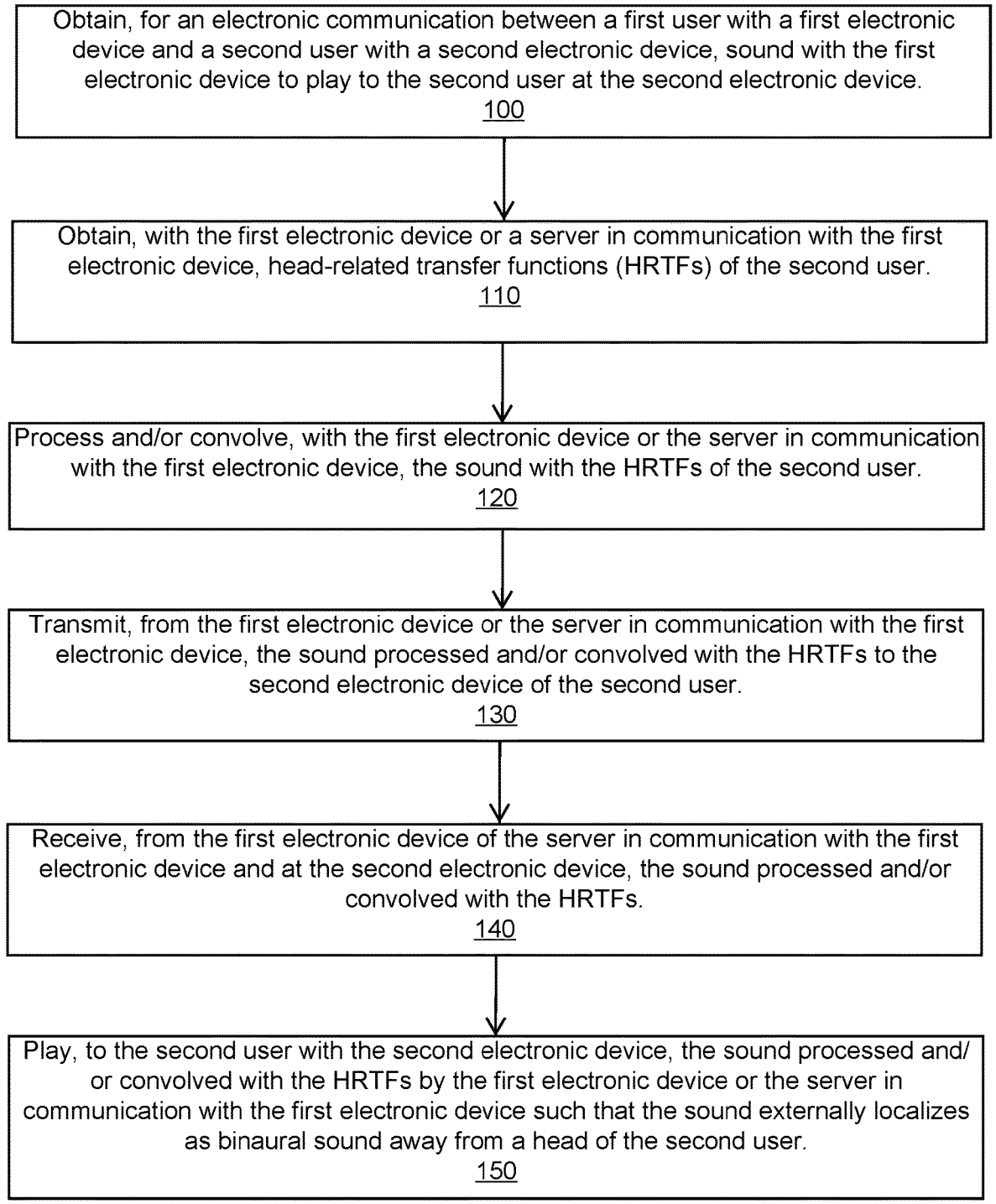
FIG. 1 is a method that expedites processing and/or playing of binaural sound during an electronic communication between a first user and a second user in accordance with an example embodiment.

Example embodiments include methods and apparatus that expedite processing and/or playing of binaural sound to a listener.

During an electronic communication between a first user and a second user, an electronic device of the first user convolves sound into binaural sound for the second user before the binaural sound transmits to the electronic device of the second user. In this way, processing or playing of binaural sound is expedited since the binaural sound is already convolved and ready to play upon receipt at the electronic device of the second user.

Example embodiments include methods and apparatus that enable users to control access to HRTFs and playing of binaural sound to the users.

Other example embodiments are discussed herein.

DETAILED DESCRIPTION

Binaural sound or three-dimensional (3D) sound externally localizes away from a head of the listener, unlike stereo or mono sound that localizes inside the head of the listener or localizes to a physical sound speaker. Thus, when a listener hears binaural sound, a source or location of the sound occurs outside the head of the listener even though this location may be in empty space or space not occupied with a physical sound speaker.

Binaural sound has many technical challenges and problems, especially when users exchange or play binaural sound during an electronic communication. Example embodiments offer solutions to these challenges and problems.

One problem during an electronic communication is that processing or convolving sound with head-related transfer functions (HRTFs) is process intensive. Electronic devices often use a dedicated or specialized processor, such as a digital signal processor (DSP), to perform the task of convolving sound into binaural sound. This task can be especially process intensive if the head of the listener is moving, the sound is moving with respect to the listener, or the sound must be repeatedly convolved with different pairs of HRTFs. If the processor in the electronic device cannot convolve the sound quickly enough, the sound the listener hears may appear delayed or jumpy and ultimately diminish the experience of hearing binaural sound.

Example embodiments solve these problems and others.

During an electronic communication between a first user and a second user, an electronic device of the first user convolves sound into binaural sound for the second user before the binaural sound transmits to the electronic device of the second user. In this way, the binaural sound is already convolved and ready to play upon receipt at the electronic device of the second user. This process expedites playing of the binaural sound at the electronic device of the second user since this electronic device is not required to convolve the sound into binaural sound before the listener hears the sound. The binaural sound received is ready for immediate play at the electronic device of the second user. This process also saves processing resources at the electronic device of the second user since a DSP at the electronic device of the second user is not required to convolve the sound.

Consider an example in which two users engage in an electronic communication, such as a telephone call or sending graphical representations that play binaural sound. The electronic device of the second user may not have a DSP or a capability to convolve sound. Alternatively, this electronic device may have a DSP but the DSP may be busy or not able to convolve the sound in real-time to provide the listener with an effective listening experience. An example embodiment solves these problems since the electronic device of the first user convolves the sound before sending the sound to the electronic device of the second user. Alternatively, a server in communication with the first electronic device convolves the sound. In this way, the electronic device of the second user is relieved of process intensive convolution tasks and can more quickly provide the binaural sound to the second user.

The processing tasks of convolving binaural sound are thus provided by the first electronic device or server instead of conventional techniques in which such processing tasks of convolving the sound are provided by the second electronic device.

Another problem is that users may not want to share their customized HRTFs with other people or have unauthorized people, electronic devices, or other entities access their customized HRTFs. If a third party obtains the customized HRTFs of a user, then this third party can control where binaural sound originates to the user. The third party can convolve sounds so they appear outside and away from the head of the user even though the user does not want to hear the sound at these locations. The parties can thus invade the privacy or listening space of the user.

Example embodiments restrict who or what can access customized HRTFs of a user. If a person, electronic device, and/or software program does not have authorization to access the customized HRTFs of a user, then access is denied. By way of example, users can control access through privacy settings or other example embodiments discussed herein.

Another problem is that users may not want to hear sound as binaural sound or may want to restrict who can send and/or play binaural sound to them. For example, a user might not want to give advertisers or strangers the ability to send and/or to play binaural sound. Users may want to restrict what people, electronic devices, or software programs have the ability to send and/or play binaural sound to the users.

Example embodiments solve these problems and others.

Example embodiments restrict who or what can send and/or play binaural sound to a user. If a person, electronic device, and/or software program does not have authorization to send and/or play binaural sound to a user, then playing of the binaural sound is rejected or prohibited. The sound may not play to the user, or the sound may be converted to mono sound or stereo sound and then played to the user. By way of example, users can control the sending and/or playing of binaural sound through privacy settings or other example embodiments discussed herein.

Consider an example in which an advertiser telephones a user. The advertiser has HRTFs for the user and convolves the sound with these HRTFs. When the user answers the call, the user hears a computer program voice of an advertisement. Since the user is wearing headphones or earphones, this voice externally localizes as binaural sound about one meter away from the head of the user. The user, however, did not want to hear the voice as binaural sound since a friend of the user was sitting at the location where the voice externally localized. Example embodiments solve this problem since the user is able to determine in advance who can play binaural sound to the user. In this instance, the user could have set privacy settings to reject the incoming call as binaural sound and instead play the incoming call as mono sound or stereo sound.

FIG. 1 is a method that expedites processing and/or playing of binaural sound during an electronic communication between a first user and a second user in accordance with an example embodiment.

Block 100 states obtain, for an electronic communication between a first user with a first electronic device and a second user with a second electronic device, sound with the first electronic device to play to the second user at the second electronic device.

By way of example, a computer or electronic device generates the sound (computer-generated sound), or microphones capture and record the sound to be sent. For example, one or more microphones capture the sound as mono sound or stereo sound when the first user speaks a message or a voice call to the second user. As another example, the first electronic device or a server in communication with the first electronic device includes a plurality pre-recorded or previously generated sounds that will play to the second user.

The sound can be stored in memory of an electronic device, obtained from memory of an electronic device (such as a computer or server), and/or transmitted or streamed over one or more networks.

Consider an example in which the first electronic device executes a mobile software messaging application that includes hundreds or thousands of sound clips or sound files. The first electronic device obtains or has access to these sound clips or sound files and can send them to other users of the mobile software messaging application.

Consider an example in which the first electronic device obtains the sound when the first user speaks into microphones in the first electronic device or in communication with the first electronic device. The microphones records the voice of the first user as he or she records a message or sound to be played to the second user.

Consider an example in which the first and second users talk to each other during an electronic call, telephony call, or telephone call (e.g., a Voice over Internet Protocol or VoIP call). One or more microphones in or in communication with the electronic device of the first user capture the voice of the first user.

Block 110 states obtain, with the first electronic device or a server in communication with the first electronic device, head-related transfer functions (HRTFs) of the second user.

For example, the electronic device retrieves or receives the HRTFs of the second user from memory, such retrieving them from the first electronic device, from a server, from a database, from a network location, etc.

The HRTFs can be generic HRTFs, customized HRTFs, or HRTFs that are customized to the listener. Customized HRTFs or HRTFs that are customized to the listener are specific to an anatomy of a particular listener and are based on a size and/or shape of the head and/or ears of the listener. Customized HRTFs can be obtained from actual measurements (e.g., measuring HRIRs and/or BRIRs from a head of the user) or from computational modeling (e.g., modeled from a photo of the user or modeled from measurements or approximations of the listener, such as a size and/or shape of the listener's head or ears). Customized HRTFs are also known as individualized HRTFs.

Generic HRTFs are not specific to an anatomy of the listener. Generic HRTFs can be obtained from actual measurements (e.g., measuring HRIRs and/or BRIRs from a head of the user or a dummy head) or from computation modeling. Generic HRTFs can work for a large group of people since these HRTFs are not customized or individualized to each person. These HRTFs are often stored in public databases and available to the generally public to use free of charge.

Although both generic and customized HRTFs can be used to convolve sound, customized HRTFs work better in that they more accurately and consistently externally localize sound to the listener. This is true because customized HRTFs enable the listener to hear sound provided through speakers in a same way as hearing sound in their environment. Customized HRTFs copy or emulate the impulse responses of the human head and ears of the listener.

Generic HRTFs can successfully convolve sound to external locations for some people but not others. Further, different users hearing sound convolved with generic HRTFs may hear the sound localizing from different locations. For instance, user 1 hears the sound externally localizing in empty space one meter away and on a right side of his or her head. User 2 hears the same sound externally localizing in empty space behind his or her head. User 3 hears the same sound with no external localization but instead hears the sound originating inside his or her head. By contrast, if the sound were convolved with customized HRTFs particular for each user, user 1, 2, and 3 will hear the sound externally localizing to the same relative location with respect to their head.

Block 120 states process and/or convolve, with the first electronic device or the server in communication with the first electronic device, the sound with the HRTFs of the second user.

For example, a processor (such as a DSP) processes or convolves the sound with one or more of head-related transfer functions (HRTFs), head-related impulse responses (HRIRs), room impulse responses (RIRs), room transfer functions (RTFs), binaural room impulse responses (BRIRs), binaural room transfer functions (BRTFS), interaural time delays (ITDs), interaural level differences (ITDs), and a sound impulse response.

An example embodiment processes or convolves the sound with the HRTFs before the sound is provided to the electronic device of the second user. This expedites processing and/or playing of the sound to the second user since the second user does not have to wait while a processor processes or convolves the sound into binaural sound. Furthermore, the processor (such as the DSP) in the electronic device of the second user can be devoted to other tasks instead of convolving the sound into binaural sound. Furthermore, the electronic device of the second user may not have a dedicated DSP or processor capable of convolving sound.

Sound includes, but is not limited to, one or more of stereo sound, mono sound, binaural sound, computer-generated sound, sound captured with microphones, and other sound. Furthermore, sound includes different types including, but not limited to, music, background sound or background noise, human voice, computer-generated voice, and other naturally occurring or computer-generated sound.

When the sound is recorded or generated in mono sound or stereo sound, convolution changes the sound to binaural sound. For example, one or more microphones record a human person speaking in mono sound or stereo sound, and a processor processes this sound with filters to change the sound into binaural sound.

The processor or sound hardware processing or convolving the sound can be located in one or more electronic devices or computers including, but not limited to, headphones, smartphones, tablet computers, electronic speakers, head mounted displays (HMDs), optical head mounted displays (OHMDs), electronic glasses (e.g., glasses that provide augmented reality (AR)), servers, portable electronic devices (PEDs), handheld portable electronic devices (HPEDs), wearable electronic devices (WEDs), and other portable and non-portable electronic devices. These electronic devices can also be used to execute example embodiments.

In one example embodiment, the DSP is located in the electronic device of the first user. In other example embodiments, the DSP is located in other electronic devices, such as a server in communication with the first and second electronic devices.

The DSP processes or convolves stereo sound or mono sound with a process known as binaural synthesis or binaural processing to provide the sound with sound localization cues (ILD, ITD, and/or HRTFs) so the listener externally localizes the sound as binaural sound or 3D sound.

An example embodiment models the HRTFs with one or more filters, such as a digital filter, a finite impulse response (FIR) filter, an infinite impulse response (IIR) filter, etc. Further, an ITD can be modeled as a separate delay line.

When the binaural sound is not captured (e.g., on a dummy head or human head), the captured sound is convolved with sound localization information (SLI). This information includes one or more of HRTFs, HRIRs, BRTFs, BRIRs, ILDs, ITDs, and/or other information discussed herein. By way of example, SLI are retrieved, obtained, or received from memory, a database, a file, an electronic device (such as a server, cloud-based storage, or another electronic device in the computer system or in communication with a PED providing the sound to the user through one or more networks), etc. Instead of being retrieved from memory, this information can also be calculated in real-time.

A central processing unit (CPU), processor (such as a DSP), or microprocessor processes and/or convolves the sound with the SLI, such as a pair of head related transfer functions (HRTFs), ITDs, and/or ILDs so that the sound will localize to a zone, area, or sound localization point (SLP). For example, the sound localizes to a specific point (e.g., localizing to point $(r, \theta, \phi)$) or a general location or area (e.g., localizing to far-field location $(\theta, \phi)$ or near-field location $(\theta, \phi)$). As an example, a lookup table that stores a set of HRTF pairs includes a field/column that specifies the coordinates associated with each pair, and the coordinates indicate the location for the origination of the sound. These coordinates include a distance (r) or near-field or far-field designation, an azimuth angle ($\theta$), and/or an elevation angle ($\phi$).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener as the customized HRTFs.

A HRTF is a function of frequency (f) and three spatial variables, by way of example $(r, \theta, \phi)$ in a spherical coordinate system. Here, r is the radial distance from a recording point where the sound is recorded or a distance from a listening point where the sound is heard to an origination or generation point of the sound; $\theta$ (theta) is the azimuth angle between a forward-facing user at the recording or listening point and the direction of the origination or generation point of the sound relative to the user; and $\phi$ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near-field and far-field distances and corresponding HRTFs. A "near-field" distance is one measured at about one meter or less; whereas a "far-field" distance is one measured at about one meter or more. Example embodiments are implemented with near-field and far-field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The coordinates (r, θ, φ) for external sound localization can also be calculated from a measurement of an orientation of and a distance to the face of the person when a head related impulse response (HRIR) is captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as "a" and "b" coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information are calculated or extracted from the HRTF data files. A unique set of HRTF information (including r, θ, φ) is determined for each unique HRTF.

The coordinates and other HRTF information are also stored in and retrieved from memory, such as storing the information in a look-up table. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person (e.g., when the sound is provided as mono sound or stereo sound). Sound can also switch between externally localizing and internally localizing, such as appearing to move and pass through a head of a listener.

SLI can also be approximated or interpolated based on known data or known SLI, such as SLI for other coordinate locations. For example, a SLP is desired to localize at coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40°) are approximated from the two known locations. These approximated HRTFs are provided to convolve sound to localize at the desired coordinate location (2.0 m, 0°, 40°).

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file or sound clip) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves the input signals into binaural audio output or binaural stereo tracks. For example, the input signals are convolved into binaural audio output that is specific or individualized for the listener based on one or more of the impulse responses to the listener.

The FIR filters are derived binaural impulse responses. Alternatively or additionally, the FIR filters are obtained from another source, such as generated from a computer simulation or estimation, generated from a dummy head, retrieved from storage, computed based on known impulse responses captured from people, etc. Further, convolution of an input signal into binaural output can include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization. Consider an example in which the ITD is calculated for a location (θ, φ) with discrete Fourier transforms (DFTs) calculated for the left and right ears. The ITD is located at the point for which the function attains its maximum value, known as the argument of the maximum or arg max as follows:

$$ITD = \arg\max(\tau) \sum_n d_{l,\theta,\phi}(n) \cdot d_{r,\theta,\phi}(n+\tau).$$

Subsequent sounds are filtered with the left HRTF, right HRTF, and/or ITD so that the sound localizes at (r, θ, φ). Such sounds include filtering stereo and monaural sound to localize at (r, θ, φ). For example, given an input signal as a monaural sound signal s(n), this sound is convolved to appear at (θ, φ) when the left ear is presented with:

$$s_l(n) = s(n-ITD) \cdot d_{l,\theta,\phi}(n);$$

and the right ear is presented with:

$$s_r(n) = s(n) \cdot d_{r,\theta,\phi}(n).$$

Consider an example in which a dedicated digital signal processor (DSP) executes frequency domain processing to generate real-time convolution of monophonic sound to binaural sound.

By way of example, a continuous audio input signal x(t) is convolved with a linear filter of an impulse response h(t) to generate an output signal y(t) as follows:

$$y(\tau) = x(\tau) \cdot h(\tau) = \int_0^\infty x(\tau - t) \cdot h(t) \cdot dt.$$

This reduces to a summation when the impulse response has a given length N and the input signal and the impulse response are sampled at t=iDt as follows:

$$y(i) = \sum_{j=0}^{N-1} x(i-j) \cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is pre-processed to generate left and right audio streams that are mapped to one or more sound sources or sound localization points (known as SLPs). These streams are convolved with a binaural impulse response for the left ear and the right ear to generate the left and right binaural output sound signal. The output sound signal is further processed depending on a final destination. For example, a cross-talk cancellation algorithm is applied to the output sound signal when it will be provided through loudspeakers or applying artificial binaural reverberation to provide 3D spatial context to the sound.

Block 130 states transmit, from the first electronic device or the server in communication with the first electronic device, the sound processed and/or convolved with the HRTFs to the second electronic device of the second user.

The first electronic device or the server transmits the sound over one or more wired or wireless networks (e.g., a cellular network, the internet, etc.) to the second electronic device. For example, the first electronic device includes a wireless transmitter/receiver that sends the sound.

Consider an example in which the first user commands or instructs a sound clip to play to the second user during an electronic communication between the first and second users. In response to this command or instruction, the first electronic device convolves the sound with generic or customized HRTFs of the second user and transmits the convolved sound clip and a 3D moving emoji to the second electronic device.

In another example embodiment, a server or another electronic device transmits the sound to the second electronic device. Consider an example in which the first and second users talk or message each other with a mobile messaging software application. The application executes on the electronic devices and one or more servers. When the first user clicks on a 3D sound emoji, this action causes one of the servers to convolve the sound with generic or customized HRTFs and then transmit the 3D emoji and convolved sound to the second electronic device.

Block 140 states receive, from the first electronic device or the server in communication with the first electronic device and at the second electronic device, the sound processed and/or convolved with the HRTFs.

The second electronic device receives the sound from the first electronic device or another electronic device (e.g., a server) in communication with the first electronic. For example, the second electronic device includes a wireless transmitter/receiver that receives the sound over one or more networks.

Block 150 states play, to the second user with the second electronic device, the sound processed and/or convolved with the HRTFs by the first electronic device or the server in communication with the first electronic device such that the sound externally localizes as binaural sound away from a head of the second user.

The sound plays to the listener as binaural sound that externally localizes away from or outside of the head of the listener. For example, headphones or earphones provide this sound at one or more sound localization points (SLPs) discussed herein.

Consider an example in which the second user receives the binaural sound to play, such as a recorded voice message, a sound clip, voice during a telephone call, or streaming audio from the first user. When the second user hears this sound with headphones or earphones, the sound externally localizes as binaural sound outside of and away from the head of the second user. This SLP can be, for example, a location in empty space where no tangible object exists, a location in empty space where an image exists, a location in occupied space where no electronic device exists (e.g., sound localizing to a stuffed animal, chair, or wall), or a location in occupied space where an electronic device exists (e.g., sound localizing to an electronic watch with no speakers).

Consider an example in which two users talk during a telephone call. The electronic device of the second user, however, does not have DSP. The voice of the first user transmits through a server that convolves the voice with customized HRTFs of the second user. When the electronic device of the second user receives the sound (here, the voice), it is already convolved and ready for immediate play to the second user who is wearing headphones.

Figure 2:
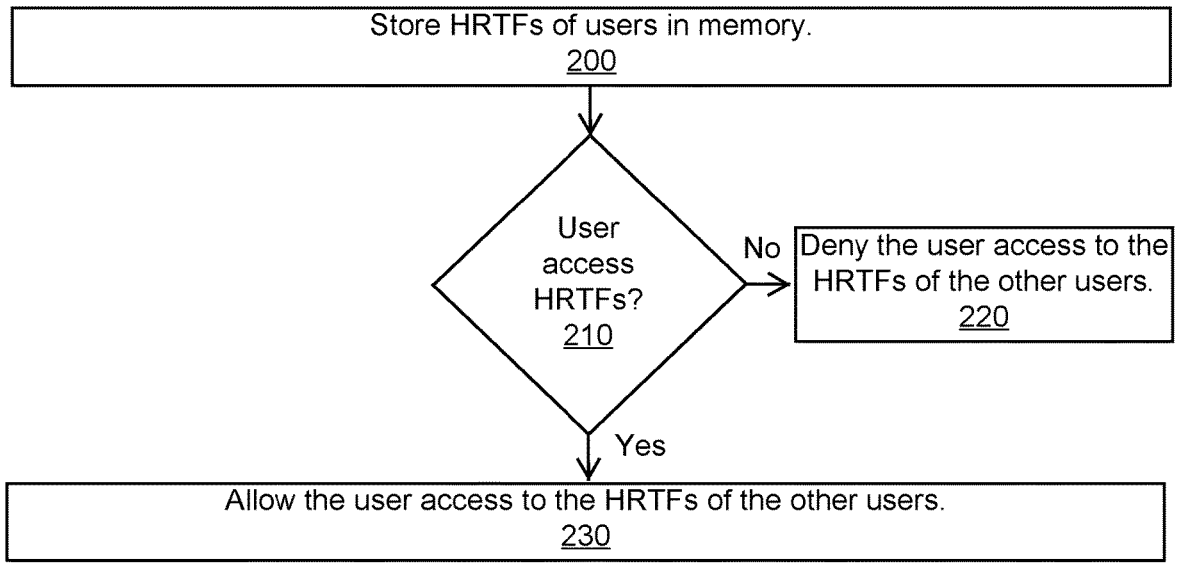
FIG. 2 is a method that allows or denies a user access to HRTFs of other users in accordance with an example embodiment.

FIG. 2 is a method that allows or denies a user access to HRTFs of other users in accordance with an example embodiment.

Block 200 states store HRTFs of users in memory.

For example, generic or customized HRTFs of users are stored in an electronic device including, but not limited to, a portable electronic device, a handheld portable electronic device, a hard disk, flash memory, portable memory, a laptop computer, a tablet computer, a server, a database (e.g., a relational or graph database), a data center, or a location on a network or cloud.

The HRTFs and/or names or identities of the users to whom the HRTFs belong can be encrypted to protect against theft and unwanted use.

Block 210 makes a determination as to whether to allow a user to have access to HRTFs of other users.

Consider an example in which users can access HRTFs of other users with access privileges or credentials provided to an electronic device, such as a server, database, or HPED. By way of example, in order to access the HRTFs, the user or electronic device provides a username and password, passphrase, login ID, passcode, a key or an encryption key, facial recognition, thumb print ID, an address (e.g., an IP address or MAC address), pin code, etc. This information can also be used to unlock or decrypt the HRTFs (e.g., when they are locked or encrypted).

Consider an example in which the names or identifications of the entities having access or not having access are stored in a table. Entities include, but are not limited to, people, electronic devices, organizations, companies, friends, family, websites, software programs, etc. When an entity requests access to the HRTFs of the user, an electronic device or software program checks the table to determine whether the entity has access privileges or does not have access privileges to the HRTFs of the user. For example, if the entity is not listed in the table as having access privileges, access is denied. Alternatively, if the entity is not listed in the table as having access privileges, then access is denied pending authorization from the user. As another example, if the entity did not provide the correct username and password or other credentials, then access is denied.

Generally, each user wants to control who or what has access to the HRTFs of the user. This enables each user to determine what entities can access the HRTFs of the user, especially customized HRTFs since these are unique to each user. Users can input or provide this information about which entities have or do not have access to the HRTFs. This information can also be input or provided with an electronic device or software program. For example, a software program automatically gathers and inputs or updates this information.

Consider an example embodiment in which a user provides or inputs names or identifications of each entity entitled to access the HRTFs of the user. The user can also provide names or identifications of each entity not entitled to access the HRTFs of the user. This information is stored in memory, such as being stored in a database, file, or lookup table.

Consider an example in which a software program or an electronic device provides the names or identifications of the entities that have access privileges or rights to the HRTFs and/or entities that do not have access privileges or rights to the HRTFs. For example, the software programs extracts, retrieves, gathers, receives, or obtains names from and allows access to HRTFs for people in an electronic address book of the user, for people who are friends of the user at a social networking website, for people who are relatives of the user, for people who are business associates or colleagues of the user, for people who execute a same software application as the user (e.g., both the user and the people use the same mobile messaging software application and appear as friends or contacts to the user), for people who the user liked via social media, for people who are followers of the user of an internet-based photo-sharing software application, for people who are listed as a contact in the user's email or contacts list, for people who work at a same company or organization as the user, for people who belong to a same group, etc.

If the answer to the determination in block 210 is "no" then flow proceeds to block 220 that states deny the user access to the HRTFs of the other users.

The user or entity requesting access to the HRTFs does not have privileges, authentication, credentials, or permissions to access the HRTFs. For example, the user or entity did not provide a correct access code or password. As another example, the user was not attempting access from a mobile messaging software application that is required to access the HRTFs of other users also executing and communicating via the mobile messaging software application.

Consider an example in which two users (a first user and a second user) electronically communicate via a mobile messaging software application that provides voice messaging, calls, texting, and sending graphical representations with sound (such as emoji and animoji). When the electronic communication commences, the electronic device of the first user sends the electronic device of the second user a request for customized HRTFs of the second user or access to these HRTFs. The second electronic device consults privacy settings of the second user. These privacy settings include a list of entities entitled to have access to the customized HRTFs of the second user. The first user is not on this list, so the second electronic device responds to the request with a denial. The first and second users are still able to electronically communicate via the software application but the electronic device of the first user is not able to convolve sound with the customized HRTFs before sending sound to the electronic device of the second user.

If the answer to the determination in block 210 is "yes" then flow proceeds to block 230 that states allow the user access to the HRTFs of the other users.

The user or entity requesting access to the HRTFs does have privileges, authentication, credentials, or permissions to access the HRTFs. For example, the user or entity provides a correct access code or password. As another example, the user attempting access from a mobile messaging software application is allowed access since this user appears as friend or contact with the user from whom the HRTFs are being requested.

Consider an example in which two users (a first user and a second user) electronically communicate via a mobile messaging software application that provides voice messaging, calls, texting, and sending graphical representations with sound (such as emoji and animoji). When the electronic communication commences, the electronic device of the first user sends the electronic device of the second user a request for customized HRTFs of the second user or access to these HRTFs. The electronic device of the second user displays a message to the second user with this request. For example, the requests displays as follows: "Allow access to HRTFs?" The second user affirms the request. In response to this confirmation, the electronic device of the first user sends the electronic device of the second user a time-based one-time password (TOTP) that is computed from a shared secret and current time. The TOTP is a hash-based message authentication code (HMAC) with a timestamp that expires after a predetermined amount of time (e.g., expire after one hour or another time). Using this TOTP, the electronic device of the first user downloads the customized HRTFs of the second user. The electronic device of the first user then convolves sound with the customized HRTFs before sending the sound to the electronic device of the second user.

Figure 3:
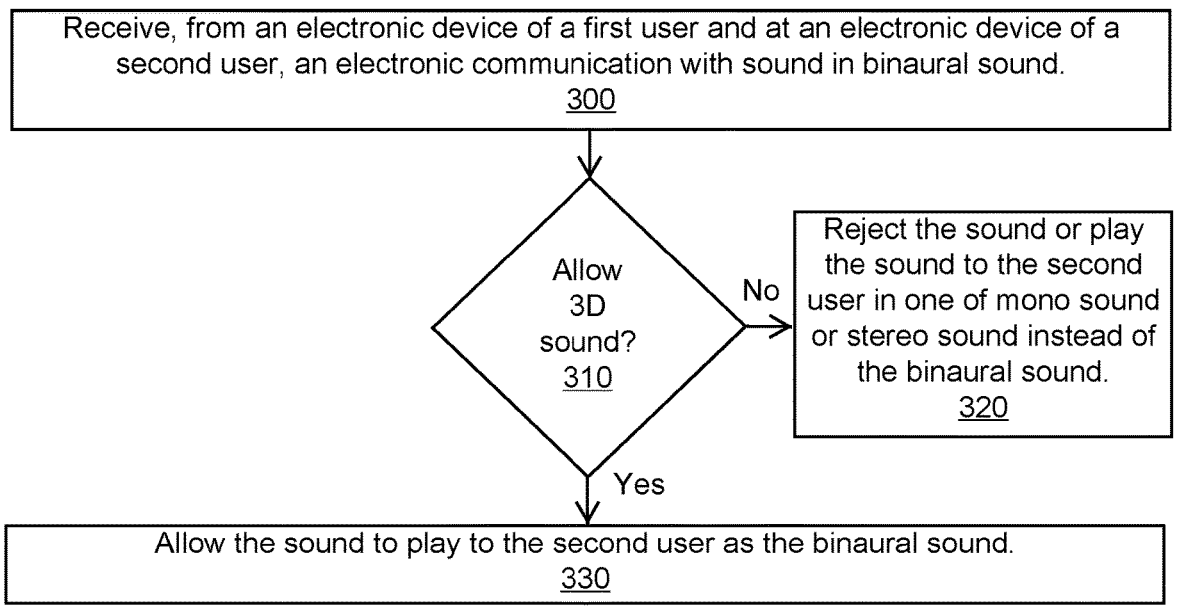
FIG. 3 is a method that allows or denies a first user to provide binaural sound to a second user in accordance with an example embodiment.

FIG. 3 is a method that allows or denies a first user to provide binaural sound to a second user in accordance with an example embodiment.

Block 300 states receive, from an electronic device of a first user and at an electronic device of a second user, an electronic communication with sound in binaural sound.

The electronic device of the second user receives sound in binaural sound from the first user. For example, this sound was previously convolved into binaural sound or captured as binaural sound. For example, the first and second users exchange voice messages or graphical representations with sound in binaural sound. As another example, the first and second users engage in a telephone call in which the voice of the first user is in binaural sound.

Consider an example in which the binaural sound is convolved with generic HRTFs or customized HRTFs of the second user. This sound will externally localize outside of and away from the head of the second user since the second user wears headphones or earphones.

Block 310 makes a determination as to whether to allow the sound to play as binaural sound (aka, 3D sound).

In some instances, the second user or the listener may not want to hear sound play as binaural sound but would prefer to hear the sound play as mono sound or stereo sound. For example, the listener is located in a confined space, and the sound would localize to an unintended object near the listener. As another example, several people are standing or sitting near the listener, and the sound would localize to one of these people and confuse the listener as to who is talking. As another example, the first user is an advertising company, manufacturer, or retailer, and the listener does not want the sound to play in his or her private space which the listener considers to be within a radius of two meters from his or her head. One skilled in the art can appreciate that there are many reasons why the second user or an electronic device of the second user would not want the sound to play as binaural sound but would prefer mono or stereo sound.

Consider an example in which the second user navigates to his or her user preferences and selects "no binaural sound" or "no 3D sound." Subsequently, sound is played to the second user as mono or stereo sound and not binaural sound.

Consider an example in which the first user must have an access privilege, a permission, credentials, right, or a confirmation in order to play binaural sound to the second user. By way of example, in order to play binaural sound to the second user, the first user or the electronic device of the first user must provide a username and password, passphrase, login ID, passcode, a key or an encryption key, facial recognition, thumb print ID, an address (e.g., an IP address or MAC address), pin code, etc.

Consider an example in which the names or identifications of the entities having privileges or rights to play binaural sound to the second user are stored in a table. When an entity sends binaural sound to the second user or electronic device of the second user, the electronic device of the second user or software program checks the table to determine whether the entity has the right to play sound to the second user as binaural sound. For example, if the entity is not listed in the table as having such right or privilege, playing of binaural sound is denied. Alternatively, if the entity is not listed in the table as having such right or privilege, then access is denied pending authorization from the second user.

Consider an example in which electronic devices of users transmit sound over one or more wireless networks in network packets or files. In order to play binaural sound to the second user, the network packet or file must contain a code or key to show the first user is authorized to play the binaural sound to the second user. The electronic device of the second user retrieves this code or key to determine whether a match exists that authorizes playing of binaural sound.

Generally, each user wants to control who or what has the right to play binaural sound. This enables each user to determine what entities can have rights to play binaural sound and what entities do not have such rights. Users can input or provide this information about which entities have or do not have such rights. This information can also be input or provided with an electronic device or software program. For example, a software program automatically gathers and inputs or updates this information.

Consider an example embodiment in which a user provides or inputs names or identifications of each entity entitled to play binaural sound to the user. The user can also provide names or identifications of each entity not entitled to play binaural sound to the user. This information is stored in memory, such as being stored in a database, file, or lookup table.

Consider an example in which a software program or an electronic device provides the names or identifications of the entities that have access privileges or rights to play binaural sound and/or entities that do not have access privileges or rights to play binaural sound. For example, the software programs extracts, retrieves, gathers, receives, or obtains names from people in an electronic address book of the user, for people who are friends of the user at a social networking website, for people who are relatives of the user, for people who are business associates or colleagues of the user, for people who execute a same software application as the user (e.g., both the user and the people use the same mobile messaging software application and appear as friends or contacts to the user), for people who the user liked via social media, for people who are followers of the user of an internet-based photo-sharing software application, for people who are listed as a contact in the user's email or contacts list, for people who work at a same company or organization as the user, for people who belong to a same group, etc.

If the answer to the determination in block 310 is "no" then flow proceeds to block 320 that states reject the sound or play the sound to the second user in one of mono sound or stereo sound instead of the binaural sound.

When authorization is denied, the electronic device of the second user can refuse to play the sound to the second user. For example, an incoming telephone call is rejected or an incoming emoji with sound is rejected.

When authorization is denied, the electronic device of the second user can play the sound to the second user as one of mono sound or stereo sound instead of the binaural sound. For example, an incoming telephone call or incoming emoji with sound is accepted but the sound plays to the second user as mono or stereo sound and not binaural sound as received from the electronic device of the first user.

Consider an example in which the electronic device of the second user receives a voice message in binaural sound. The second user clicks or activates the sound to play but is unaware that the sound was sent as binaural sound. The second user, however, previously set sound settings in the electronic device to the following: "Request authorization before playing binaural sound." When the second user clicks or activates the sound, a message displays to the second user: "Play sound as 3D sound?" If the second user accepts, then the sound plays as binaural sound. If the second user denies, then the sound plays as mono sound.

The user or entity desiring to play sound as 3D sound or binaural sound does not have privileges, authentication, credentials, or permissions to play 3D sound or binaural sound to the second user. For example, the user or entity did not provide a correct access code or password. As another example, the user was not attempting access from a mobile messaging software application that is required to play binaural sound to other users also executing and communicating via the mobile messaging software application.

Consider an example in which two users (a first user and a second user) electronically communicate via a mobile messaging software application that provides voice messaging, calls, texting, and sending graphical representations with sound (such as emoji and animoji). When the electronic communication commences, the electronic device of the first user sends the electronic device of the second user a request for authorization to play binaural sound to the second user. The second electronic device receives this request and consults privacy settings of the second user. These privacy settings include a list of entities entitled to play binaural sound to the second user. The first user is not on this list, so the second electronic device responds to the request with a denial. The first and second users are still able to electronically communicate via the software application but the electronic device the plays all sound received from the first electronic device as mono sound or stereo sound. The first user or first electronic device is not authorized to play binaural sound to the second user.

If the answer to the determination in block 310 is "yes" then flow proceeds to block 330 that states allow the sound to play to the second user as the binaural sound.

The user or entity attempting to play binaural sound to the second user is authorized to do so. For example, this entity has the requisite privileges, authentication, credentials, or permissions to play binaural sound to the second user and/or at the electronic device of the second user. For example, the user or entity provides a correct access code or password. As another example, the user attempting to play binaural sound is doing so from a mobile messaging software application and is allowed since this user appears as friend or contact with the user to whom the binaural sound will be played.

Consider an example in which two users (a first user and a second user) electronically communicate via a mobile messaging software application that provides voice messaging in binaural sound, calls in binaural sound, and sending graphical representations with binaural sound (such as emoji and animoji). When the electronic communication commences, the electronic device of the first user sends the electronic device of the second user a request to play binaural sound. The electronic device of the second user displays a message to the second user with this request. For example, the requests displays as follows: "Allow playing of 3D sound?" The second user affirms the request. In response to this confirmation, the electronic device of the first user sends the electronic device of the second user sounds convolved into binaural sound. The electronic device of the second user plays these sounds in binaural sound to the second user such that the sounds externally localize in empty space or space occupied with a virtual reality (VR) or augmented reality (AR) image about one meter away from a head of the second user.

Consider another example in which two users (a first user and a second user) electronically communicate via the mobile messaging software application. The first user telephones the second user. The electronic device of the second user compares the incoming telephone number of the first user with a list of entities entitled to play binaural sound to the second user. This list includes the telephone number as being authorized. The electronic device of the second user accepts the call, and the voice of the first user plays as binaural sound to the second user.

Consider an example in which a first user records a voice message ("Hello") with a single microphone in his smartphone and sends this message with a talking 3D emoji to the second user. This emoji appears on the display of the smartphone of the second user. When the electronic device of the second user receives the sound, the sound is not yet convolved into binaural sound. The second user activates the emoji to play the sound. In response to this activation, the electronic device of the second user consults a lookup table, determines that the first user is authorized to play binaural sound to the second user, and convolves the sound with a DSP in the second electronic device. The second user is wearing headphones and hears the voice of the first user saying "Hello" that externally localizes in empty space next to the second user.

Example embodiments also include the user interacting with one or more user interfaces or electronic devices to make the selection per blocks 210 and 310. By way of example, the electronic device senses, detects, or receives one or more of a voice command, a hand gesture, body motion, eye movement, head movement, click, menu selection, touch (e.g., on a touch screen), etc. The user can also make the selection with a wand, electronic pen, or other handheld electronic device.

Consider an example in which the first user makes the selection by providing an instruction or command to an electronic device, such as a handheld portable electronic device (HPED), wearable electronic device (WED), headphones, a smartphone, an electronic watch, a television or display, a smart speaker, a server, or another electronic device.

Figure 4:
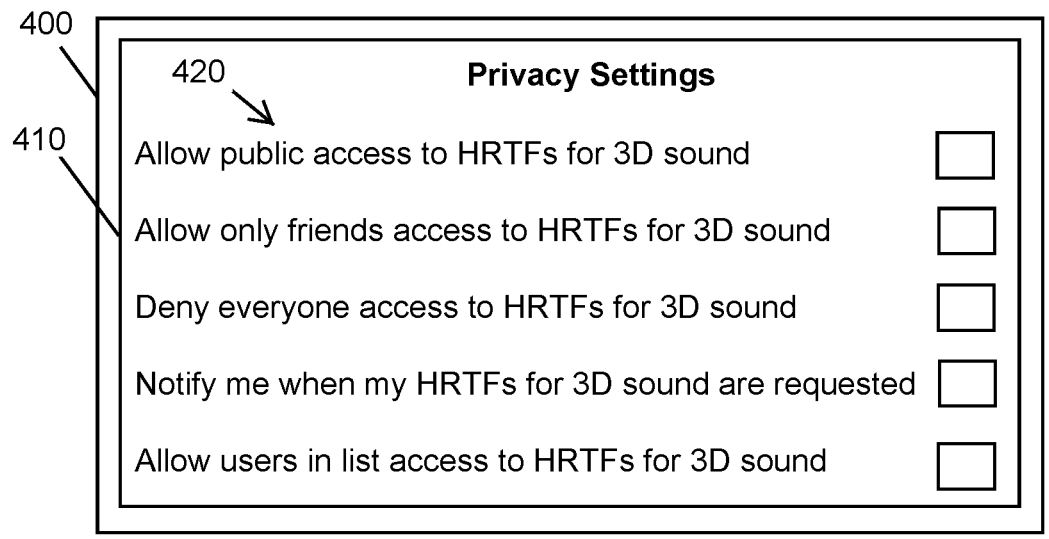
FIG. 4 is an electronic device with a display displaying privacy settings that enable a user to control access to HRTFs of the user in accordance with an example embodiment.
Figure 5:
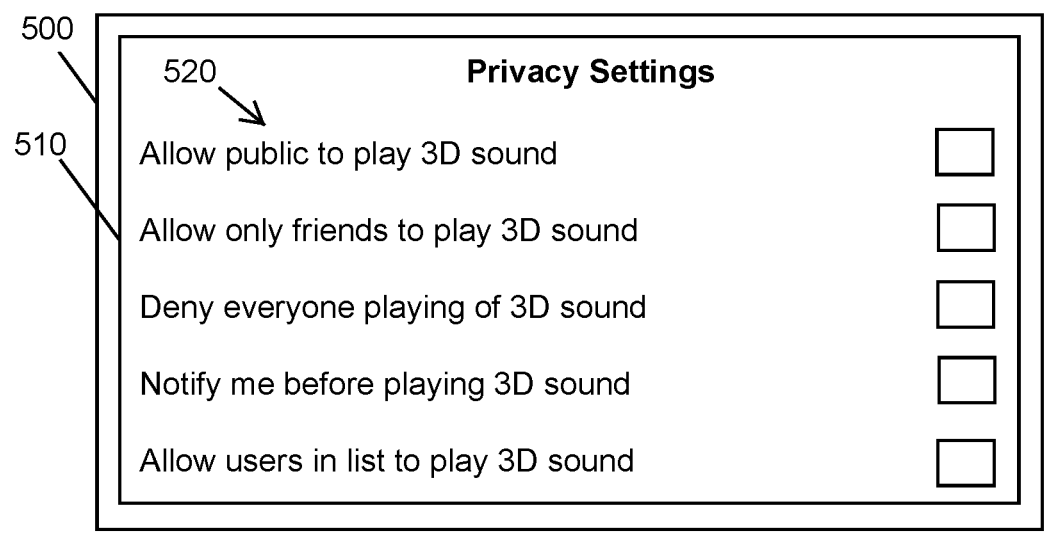
FIG. 5 is an electronic device with a display displaying privacy settings that enable a user to control playing of binaural sound or 3D sound to the user in accordance with an example embodiment.

Example embodiments enable a user to control who or what has access, authorization, privileges, permissions, credentials, or rights to HRTFs of a user and/or to playing binaural sound or 3D sound to the user. This information can be established by the user, an electronic device, and/or a software program and stored in memory in various formats and locations. FIGS. 4 and 5 provide an example of establishing this information via user preferences or privacy settings; though one of ordinary skill in the art will appreciate numerous other ways exists as well.

Privacy settings or user preferences enable a user or software program to customize, configure, and/or control access to HRTFs and playing of binaural sound to the user. This information is stored and subsequently retrieved or consulted to enable executing of software programs in accordance with the configurations of the privacy settings or user preferences.

FIG. 4 is an electronic device 400 with a display 410 displaying privacy settings 420 that enable a user to control access to HRTFs of the user in accordance with an example embodiment.

By way of example, each of the privacy settings includes a square box to indicate selection of this privacy setting by the user or software program. Examples of such privacy settings (or their functional equivalent) include, but are not limited to, the following:

(1) Allow public access to HRTFs for 3D sound. This option enables members of the public or all entities to access the HRTFs of the user.

(2) Allow only friends access to HRTFs for 3D sound. This option limits access to the HRTFs to friends. By way of example, friends include, but are not limited to, entities that the user accepted (e.g., accepted a friend request); relatives, acquaintances, friends, colleagues, or co-workers of the user; people whom the user indicated with a like; people whom the user indicated or designated with access; and people extracted from a contact list (e.g., from a contact list of friends in a mobile messaging software application).

(3) Deny everyone access to HRTFs for 3D sound. This option is most restrictive in that no entity (other than the user himself or herself) has access to the HRTFs.

(4) Notify me when my HRTFs for 3D sound are requested. This options gives the user the ability to select in real-time whether an entity does or does not have access to the HRTFs. For example, a display or voice inquiry prompts the user to allow or deny a pending user access to the HRTFs.

(5) Allow users in list access to HRTFs for 3D sound. This option enables the user or software program to add and subtract entities who have access or do not have access to the HRTFs. In this way, the user can have a customized list of such entities. Such entities can be entered, stored, and/or identified by name, address, phone number, network or computer address, URL, website, software program, unique identification, etc.

FIG. 5 is an electronic device 500 with a display 510 displaying privacy settings 520 that enable a user to control playing of binaural sound or 3D sound to the user in accordance with an example embodiment.

By way of example, each of the privacy settings includes a square box to indicate selection of this privacy setting by the user or software program. Examples of such privacy settings (or their functional equivalent) include, but are not limited to, the following:

(1) Allow public to play 3D sound. This option enables members of the public or all entities to play 3D sound or binaural sound to the user.

(2) Allow only friends to play 3D sound. This option limits friends to playing 3D sound to the user. By way of example, friends include, but are not limited to, entities that the user accepted (e.g., accepted a friend request); relatives, acquaintances, friends, colleagues, or co-workers of the user; people whom the user indicated with a like; people whom the user indicated or designated with access; and people extracted from a contact list (e.g., from a contact list of friends in a mobile messaging software application).

(3) Deny everyone playing of 3D sound. This option is most restrictive in that no entity (other than the user himself or herself) has rights to play 3D sound to the user.

(4) Notify me before playing 3D sound. This options gives the user the ability to select in real-time whether an entity can or cannot play 3D sound to the user. For example, a display or voice inquiry prompts the user to allow or deny playing of 3D sound.

(5) Allow users in list access to play 3D sound. This option enables the user or software program to add and subtract entities who have are authorized to play or not play 3D sound to the user. In this way, the user can have a customized list of such entities. Such entities can be entered, stored, and/or identified by name, address, phone number, network or computer address, URL, website, software program, unique identification, etc.

Example embodiments include the first user sending the second user a graphical representation with sound (e.g., sound that is in binaural sound or will play in binaural sound to the second user). The graphical representation and the sound transmit to the electronic device of the second user or an electronic device in communication with the electronic device of the second user. For example, the graphical representation and sound transmit from an electronic device of the first user to an electronic device of the second user or from a server in communication with the electronic device of the second user.

Consider an example in which the first user has a HPED or WED that includes a wireless transmitter/receiver that wirelessly transits the graphical representation and/or sound over one or more wireless networks to a HPED or WED of the second user.

Consider an example in which the first and second users communicate with each other via electronic devices (such as smartphones) that execute a mobile messaging software application. The electronic device of first user includes a microphone and camera that records a voice and facial images of the first user that will be played to the second user. A DSP in the first electronic device convolves the sound into binaural sound, processes and stores the facial images as a three-dimensional (3D) graphical representation, and transmits the graphical representation and binaural sound over a wireless network (e.g., the internet or cellular network) to the electronic device of the second user.

The electronic device also provides or displays the graphical representation to the second user. For example, the electronic device of the second user displays the graphical representation on, thru, or with a display.

Consider an example in which the sound corresponds to or is associated with the graphical representation. When the second user, electronic device, or software application activates the graphical representation, the binaural sound plays to the second user.

Consider an example in which the first and second user communicate with each via electronic devices. The electronic device of the first user displays a graphical representations (e.g., a plurality of different emoji or animoji) that play voice greetings or voice messages in binaural sound. For example, when activated these graphical representations play a recorded voice that says "Hello" or "How are you?" or "Hahahaha" or another message. The first user selects a graphical representation that includes a red-shaped heart and sound recording that plays "I love you." The first user selects this recording to play as binaural sound to the second user at a SLP having spherical coordinates of (r=1.0 m, θ=30°, φ=0°). The first user selects the graphical representation, and in response to this selection, the graphical representation of the red-shape heart appears on a display of an electronic device of the second user. When the second user selects the red-shaped heart a voice says "I love you" to the second user. This voice externally localizes to the second user as binaural sound and originates in empty space away from the head of the second user at the SLP of (r=1.0 m, θ=30°, φ=0°) selected by the first user.

Consider an example in which an electronic device of the first user displays a 3D emoji. When the first user selects this emoji, microphones record his or her voice message as a voice message that will be played to the second user. Selection of this emoji automatically designates the voice message as being in binaural sound. Further, selection of this emoji automatically applies a SLP where the sound will localize to the second user. For example, this location is set as a default location or previously set by the first user. A DSP in the first electronic device or a server in communication with this electronic device convolves the sound into binaural sound. The first user sends the 3D emoji to the second user. When the 3D emoji appears on the display of the electronic device of the second user, the 3D emoji automatically plays the voice message in binaural sound to the second user. The voice message externally localizes to the default location or previously set location (e.g., one meter away from the head of the second user and to a left side or right side of the face of the second user).

When sound is selected to be binaural sound, then the sound plays and externally localizes outside the head of the second user. For example, the sound originates or emanates from a SLP that is in empty space (e.g., where no physical or tangible object exists) or in occupied space.

Consider an example in which the first electronic device receives or obtains one or more head-related transfer functions (HRTFs) for convolving sound to the second user. These HRTFs include generic HRTFs or customized HRTFs to the second user. In this way, a processor, such as a digital signal processor (DSP), in the first electronic device or in communication with the first electronic device (e.g., a server) processes or convolves the sound before the sound is transmitted and/or provided to the electronic device of the second user. When the second electronic device receives or obtains the sound, the sound is already processed or convolved and ready to play as binaural sound. A processor in the second electronic device is not required to process or convolve the sound into binaural sound so the sound can immediately play to the second user without consuming processing resources of the second electronic device or without requiring processing time before being played to the second user.

Example embodiments include expediting playing or processing of the sound. One embodiment, for example, expedites processing or convolving of the sound of the graphical representation at the second electronic device by convolving, with a digital signal processor (DSP), the sound with HRTFs to change the sound into the binaural sound before transmitting the graphical representation and the sound from the first electronic device to the second electronic device and in response to receiving the selection of the first visual indication at the first electronic device. The DSP can be located in the first electronic device or a server in communication with the first and/or second electronic devices.

When the electronic device of the second user receives the graphical representation and/or sound, the sound is already convolved into binaural sound as selected by the first user and is ready for immediate play to the second user. The second user does not have to wait for a processor to convolve the sound since this convolution already occurred. The DSP convolves the sound with the HRTFs before one or more of (1) the sound is provided to the electronic device of the second user, (2) the sound is retrieved by the electronic device of the second user, (3) the sound is transmitted to the electronic device of the second user (e.g. wirelessly transmitted by a server or the first electronic device to the second electronic device), (4) the second user requests the sound to play, and (5) the second user activates the graphical representation to play the sound.

Example embodiments include saving processing resources of the DSP in the electronic device of the second user. One embodiment, for example, processes the sound before the sound is transmitted to, provide to, or retrieved by the second electronic device of the second user. In this way, the DSP in the second electronic device is not required to devote processing resources to convolution of the sound since the sound is already convolved into binaural sound and ready for immediate play to externally localize to the selected SLP.

A graphical representation can include or be associated with sound. For example, sound plays to the user when the user, an electronic device, or a software program activates the graphical representation or the sound associated with the graphical representation.

Consider an example in which two users execute a mobile messaging software application. The first user sends the second user an animated emoji (or animoji) that when activated or executed says "Hello" to the second user.

By way of example, sound can localize to the listener as mono sound or stereo sound when the sound is not convolved and played to the listener with headphones, earphones, etc. Mono sound and stereo sound can also externally localize to speakers, such as speakers in a smartphone, stereo speakers in a room, etc. Alternatively, sound externally localizes to the listener when the sound is convolved into or captured as binaural sound or 3D sound. Binaural sound externally localizes outside or away from the head of the listener and is not required to localize to a physical object, such as a speaker. For instance, binaural sound can externally localize one or more meters away from a person at a location in empty space (e.g., where no speaker exists or no physical or tangible object exists). Binaural sound can also localize to physical objects that do not have an electronic speaker, such as localizing to a wall or a chair. Sound can also localize as a mix of binaural, mono, and stereo sounds, such as sound commencing as binaural sound then transitioning to stereo sound to the listener.

If the sound is mono sound or stereo sound and not subsequently convolved with H RTFs or other sound localization information (SLI), then the sound will not externally localize as binaural sound. For instance, a user receives a graphical representation and sound recorded in mono or stereo sound. The sound is intended to play to the user as binaural sound, but the electronic device providing the sound does not have HRTFs of the user in order to convolve the sound into binaural sound.

As another example, a user receives a graphical representation and sound captured or recorded in binaural sound. The user is wearing headphones and can hear the sound as binaural sound. The electronic device of the user, however, is set to only play sound as mono or stereo sound. For instance, a permission for binaural sound is set to off, or the user has not authorized binaural sound to play with the current executing software application.

As another example, a user is at a location that restricts or prohibits the use of binaural sound. For instance, the user is located in a school, library, government building, or airplane that prohibits listeners from communicating with binaural sound.

In an example embodiment, a sound file, sound clip, streaming sound, a recording, or other type of sound associates with or corresponds to a graphical representation. Binaural sound plays to the listener when the graphical representation activates.

In an example embodiment, a user, a listener, a program or software application, or an electronic device activates the graphical representation and/or causes the binaural sound to play to the listener.

For example, the listener interacts with a user interface and provides a command or instruction to play the sound upon receiving the graphical representation. For instance, the first user performs one or more actions that include, but are not limited to, clicking or activating an icon, emoji, graphical representation, or other indicia that represents a sound clip, sound file, streaming sound, or recording, selecting the sound from a menu (such as a dropdown menu), selecting the sound from a folder or file (such as a folder or file being displayed to the first user), providing a body gesture (such as a hand gesture or hand movement indicating a desire to play the sound), providing head movement or eye movement (such as the listener moving his or her head in a certain direction or pattern to indicate selection of the sound), providing a voice command (such as the listener speaking an instruction at a natural language user interface), or taking another action to have the sound played to the listener.

As another example, the sound automatically plays. For instance, the sound plays when the listener receives the graphical representation, opens the software program providing the graphical representation, or views the graphical representation on a display.

As another example, the sound plays when a sender of the sound (e.g., another user in an electronic communication with the listener) activates the sound or designates when the sound plays.

Binaural sound is provided to the listener through one or more electronic devices including, but not limited to, one or more of headphones, earphones, earbuds, bone conduction devices, or other electronic devices with speakers at, in, or near the ears of the listener. Binaural sound can be processed for crosstalk cancellation and provided through speakers separate or away from the listener (e.g., dipole stereo speakers). Electronic devices in communication with headphones, earphones, and earbuds can provide binaural sound to the listener (e.g., a smartphone in wireless communication with earphones).

Various types of electronic devices can include or be in communication with speakers to provide binaural sound to listeners. Examples of these electronic devices include, but are not limited to, wearable electronic glasses, smartphones, head mounted displays (HMDs), optical head mounted displays (OHMDs), wearable electronic devices (WEDs), portable electronic devices (PEDs), handheld portable electronic devices (HPEDs), laptop computers, tablet computers, desktop computers, and other electronic devices.

From the point-of-view of the listener, the sound originates or emanates from an object, point, area, or direction. This location for the origin of the sound is the sound localization point (SLP). By way of example, the SLP can be an actual point in space (e.g., an empty point in space 1-2 meters away from the head of the listener) or a point on or at a physical or virtual object (e.g., a mouth or head of an augmented reality (AR) or virtual reality (VR) image). The SLP does not have to be so precise since humans are not always able to localize sound to a particle point. As such, the SLP can also be a specific or general area (e.g., a location next to and on the right side of the listener) or a specific or general direction from where the sound originates to the listener (e.g., a location several meters behind the listener).

When binaural sound is provided to the listener, the listener will hear the sound as if it originates from the sound source, the source of sound, or the SLP. The sound, however, does not originate from the sound source since the sound source or SLP may be an inanimate object with no electronics or an animate object with no electronics. Alternatively, the sound source or SLP has electronics but does not have the capability to generate sound (e.g., the sound source has no speakers or sound system). As yet another example, the sound source or SLP has speakers and the ability to provide sound but is not providing sound to the listener. In each of these examples, the listener perceives the sound to originate from the sound source or SLP, but the sound source or SLP does not produce the sound. Instead, the sound is altered or convolved and provided to the listener so the sound appears to originate from the sound source or SLP.

In an example embodiment, at least a portion of the sound associated with, corresponding to, or provided from the graphical representation externally localizes away from the head of the listener in empty space (e.g., where no physical or tangible object exists) or occupied space. For example, the sound externally localizes proximate or near the listener, such as localizing within a few meters of the listener. For instance, the SLP where the listener localizes the sound is stationary or fixed in space (e.g., fixed in space with respect to the user, fixed in space with respect to an object in a room, fixed in space with respect to an electronic device, fixed in space with respect to another object or person).

By way of example, the SLP can be an actual point in space (e.g., an empty point in space 1-2 meters away from the head of the listener) or a point on a physical or virtual object (e.g., a mouth or head of an augmented reality (AR) or virtual reality (VR) image). The SLP does not have to be so precise since humans are not always able to localize sound to a particle point. As such, the SLP can also be a general area (e.g., a location next to and on the right side of the listener) or a general direction from where the sound originates to the listener (e.g., a location several meters behind the listener).

Consider an example in which the graphical representation is an emoji that includes a talking animated animal head or human head. When a listener clicks on or activates the emoji, the head talks and the listener hears the voice as binaural sound that externally localizes about one meter away from the listener. For instance, the voice is convolved with head-related transfer functions (HRTFs) having spherical coordinates (distance r=1.0 m, elevation $\phi=0°$, azimuth $\theta=$) 30°. The listener activates the emoji and hears the voice originate from spherical coordinates (1.0, 0°, 30°).

By way of example, a computer or electronic device generates the sound (computer-generated sound), or microphones capture and record the sound to be sent. For example, one or more microphones capture the sound as mono sound or stereo sound when the first user speaks a message to the second user. As another example, the first electronic device or a server in communication with the first electronic device includes a plurality pre-recorded or previously generated sounds.

The sound can be stored in memory of an electronic device, obtained from memory of an electronic device (such as a computer or server), and/or transmitted or streamed over one or more networks.

Consider an example in which the first electronic device executes a mobile software messaging application that includes hundreds or thousands of sound clips or sound files. The first electronic device obtains or has access to these sound clips or sound files and can send them to other users of the mobile software messaging application.

Consider an example in which the first electronic device obtains the sound when the first user speaks into microphones in the first electronic device or in communication with the first electronic device. The microphones records the voice of the first user as he or she records a message or sound to be played to the second user.

The first electronic device transmits the sound and a graphical representation associated with or corresponding to the sound over one or more wired or wireless networks (e.g., a cellular network, the internet, etc.). For example, the first electronic device includes a wireless transmitter/receiver that sends the sound and graphical representation.

Consider an example in which the first user commands or instructs the sound clip to play to the second user during an electronic communication between the first and second users. In response to this command or instruction, the first electronic device transmits the sound clip and a 3D moving emoji to the second electronic device.

In another example embodiment, a server or another electronic device transmits the sound and/or graphical representation to the second electronic device. Consider an example in which the first and second users talk or message each other with a mobile messaging software application. The application executes on the electronic devices and one or more servers. When the first user clicks on a 3D sound emoji, this action causes one of the servers to transmit the 3D emoji and sound to the second electronic device.

The second electronic device receives the sound and the graphical representation from the first electronic device or another electronic device (e.g., a server) in communication with the first electronic. For example, the second electronic device includes a wireless transmitter/receiver that receives the sound and graphical representation over one or more networks.

A processor or sound hardware processes or convolves the sound with head-related transfer functions (HRTFs) or other SLI so the sound will externally localize as binaural sound to the listener.

Graphical representations can have many sizes, shapes, and forms (e.g., people, faces, characters, animals, objects, 2D, 3D, etc.). Further, the graphical representations can be static, such as a 2D or 3D emoji that do not move or change facial expressions. Alternatively, the graphical representations can be dynamic, such as 2D or 3D emoji that move, talk, change facial expressions, rotate, etc. Further yet, graphical representations in accordance with example embodiments can be presented as AR images and VR images.

The graphical representations can include or be associated with sound, such as a sound clip, a sound file, a recorded voice message, streaming audio, etc. The sound can play for a short period of time (e.g., less than one second, one second, two seconds, etc.). For example, the sound is a voice saying "Hello" or "Hahahaha" or "Thank you" or another short audio message. As another example, the sound is a computer-generated "Beep" or phone ringing or explosion sound. The sound can play for longer periods of time (e.g., ten seconds, thirty seconds, one minute, several minutes, etc.). For example, the sound is a recorded message from a user during an electronic communication between two users.

By way of example, the sound plays when the listener activates the graphical representation or another action occurs that initiates or activates playing of the sound. For example, a first user sends a second user an emoji shaped like a heart. This heart appears on a display of an electronic device of the second user. When the second user clicks on the heart, a voice in binaural sound says "I love you" to the second user.

When sound is already convolved into binaural sound, this sound can be converted back into mono or stereo sound or played as mono or stereo sound. For example, the electronic device plays the sound through a single speaker. As another example, the electronic device plays the same channel through both speakers (e.g., play the left channel sound to both the left and right speakers of the headphones or play the right channel sound to both the left and right speakers of the headphones). As another example, the sound is filtered through cross-talk canceling filters. Filters, for example, can eliminate crosstalk and the HRTFs (e.g., by utilizing an inverse filter, such as a Nelson/Kirkeby inverse filter).

Consider an example embodiment in which a first user and a second user communicate with each via their respective electronic devices. The electronic device of the second user receives a request for the HRTFs that are customized to the second user. In response to this request, the electronic device of the second user transmits the customized HRTFs to the electronic device of the first user. The electronic device of the first user then convolves the sound for the electronic device of the second user.

Consider an example embodiment in which a first user and a second user communicate with each via their respective electronic devices. The electronic device of the second user determines that the first user is a friend of the second user. In response to this determination, the electronic device of the second user authorizes the electronic device of the first user to have access to customized HRTFs of the second user.

Consider an example embodiment in which a first user and a second user communicate with each via their respective electronic devices. The electronic device of the second user consults privacy settings to determine whether the first user is authorized to have access to customized HRTFs of the second user. In response to consulting these privacy settings, the electronic device of the second user denies or allows access to the customized HRTFs. For example, the electronic device denies access to the customized HRTFs of the second user when the privacy settings indicate that the first user is not authorized to have access to the customized HRTFs of the second user. For example, the electronic device allows access to the customized HRTFs of the second user when the privacy settings indicate that the first user is authorized to have access to the customized HRTFs of the second user.

Consider an example embodiment in which a first user and a second user communicate with each via their respective electronic devices. A determination is made as to whether the first user has authorization to access to customized HRTFs of the second user. The electronic device of the first user is providing with the customized H RTFs when the first user has the authorization to access the customized HRTFs of the second user. The electronic device of the first user is providing with generic HRTFs when the first user does not have the authorization to access the customized HRTFs of the second user.

Consider an example embodiment in which a first user and a second user communicate with each via their respective electronic devices. A determination is made as to whether the first user is authorized to provide sound to the second user in the binaural sound. The voice of the first user plays to the second user in the binaural sound when the first user is authorized to provide the sound to the second user in the binaural sound. The voice of the first user is changed from being in the binaural sound to being in one of mono sound and stereo sound when the first user is not authorized to provide the sound to the second user in the binaural sound.

Consider an example embodiment in which a first user and a second user communicate with each via their respective electronic devices. During this communication (which includes a telephone call), processing resources of a DSP in the electronic device of the second are saved by convolving the voice of the first user with the DSP in the electronic device of the first user before transmitting the voice of the first user to the electronic device of the second user. The voice of the first user in the binaural sound externally localizes to the second user in empty space outside of a head of the second user.

Consider an example embodiment in which a first user and a second user communicate with each via their respective electronic devices. A determination is made as to whether the first user is authorized to send his or her voice to the second user in the binaural sound. The voice of the first user changes from being provided to the second user in binaural sound to being provided to the second user in one of mono sound and stereo sound upon determining that the first user is not authorized to send the voice to the second user in the binaural sound.

Consider an example embodiment in which a first user and a second user communicate with each via their respective electronic devices. The electronic devices expedite playing of the voice of the first user to the second user at the electronic device of the second user by convolving the voice of the first user with the DSP in the electronic device of the first user before transmitting the voice of the first user to the electronic device of the second user. The voice of the first user in the binaural sound externally localizes to the second user in empty space outside of a head of the second user.

Figure 6:
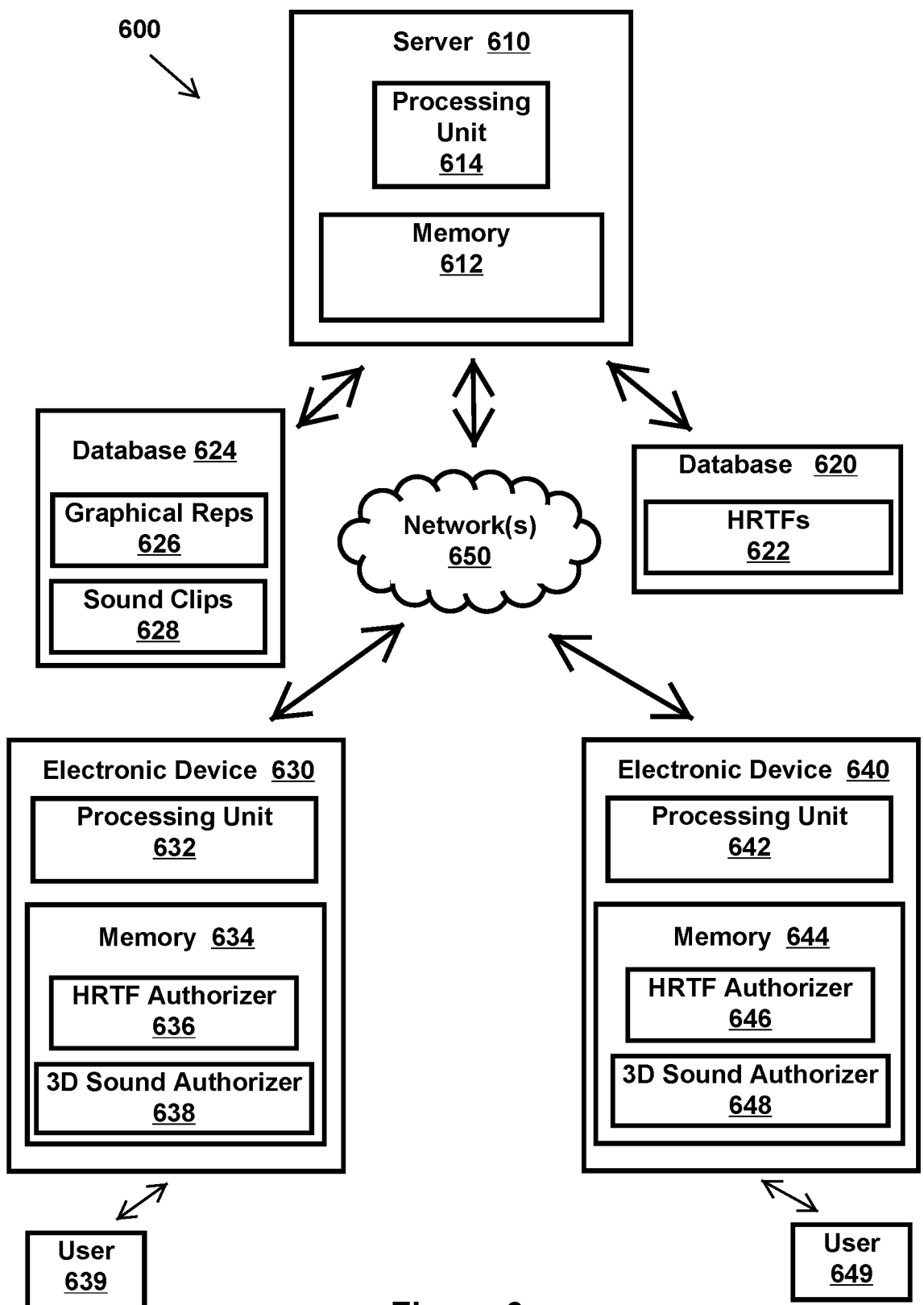
FIG. 6 is an example computer system in accordance with an example embodiment.

FIG. 6 is an example computer system 600 in accordance with an example embodiment.

The computer system 600 includes one or more of a server 610, a database 620, a database 624, an electronic device 630, and an electronic device 640 in communication over one or more networks 650. User 639 is with or uses electronic device 630, and user 649 is with or uses electronic device 640. For illustration, a single server 610, two databases 620 and 624, two electronic devices 630 and 640, and two users 639 and 649 are shown, but example embodiments can include a plurality of servers, databases, electronic devices, and users.

Server 610 includes a memory 612 and a processing unit 614. The server 610 couples to or communicates with the database 620 that includes HRTFs and other sound localization information 622 and database 624 that includes graphical representations (reps) 626 and sound clips 628.

Electronic device 630 includes a processing unit 632 and memory 634 with an HRTF authorizer 636 and a 3D sound authorizer or binaural sound authorizer 638.

Electronic device 640 includes a processing unit 642 and memory 644 with an HRTF authorizer 646 and a 3D sound authorizer or binaural sound authorizer 648.

Figure 7:
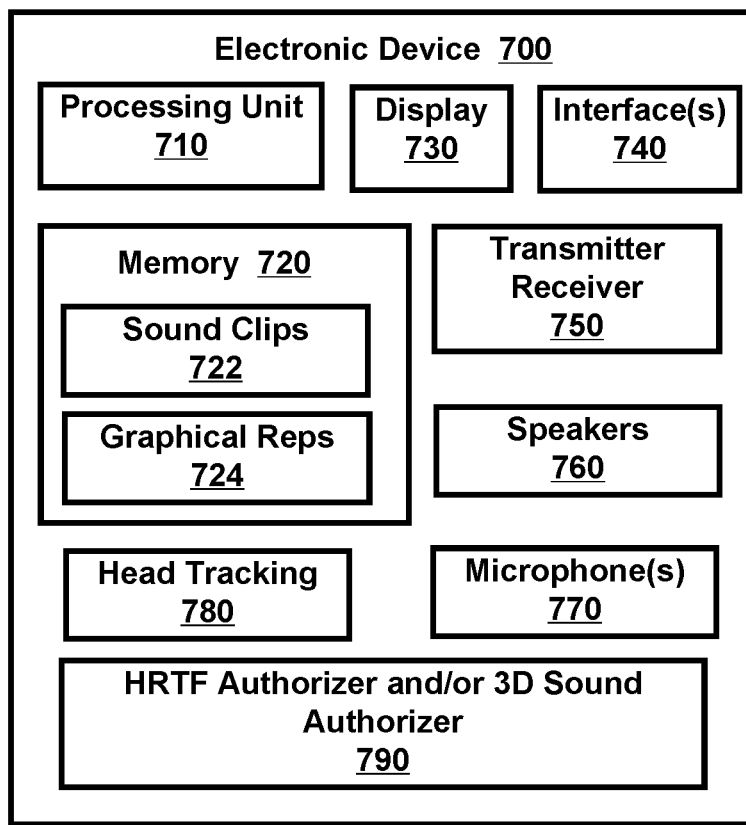
FIG. 7 is an example of an electronic device in accordance with an example embodiment.

FIG. 7 is an example of an electronic device 700 in accordance with an example embodiment.

The electronic device 700 includes a processor or processing unit 710, memory 720 with sound clips 722 and graphical representations or graphical reps 724, a display 730, one or more interfaces 740, a wireless transmitter/receiver 750, speakers 760, one or more microphones 770, head tracking 780 (such as one or more of an inertial sensor, accelerometer, gyroscope, and magnetometer), and an HRTF authorizer and/or 3D sound authorizer 790.

The HRTF authorizer and the 3D sound authorizer or binaural sound authorizer include software, hardware, and/or program instructions discussed in figures herein that determine access to HRTFs of users and playing of 3D sound or binaural sound to users as discussed herein. For example, the HRTF authorizer executes one or more blocks associated with FIG. 2, FIG. 4, and other example embodiments discussed herein. For example, the 3D sound authorizer executes one or more blocks associated with FIG. 3, FIG. 5, and other example embodiments discussed herein.

Memory includes computer readable medium (CRM). Examples of an interface include, but are not limited to, a network interface, a graphical user interface, a natural language user interface, a natural user interface, a phone control interface, a reality user interface, a kinetic user interface, a touchless user interface, an augmented reality user interface, and/or an interface that combines reality and virtuality.

Sound clips include sound files, sounds, recorded messages (such as voice messages or other recorded sound), computer-generated sounds, and other sound discussed herein. For example, users can record, exchange, and/or transmit sound clips or sounds. These sound include sending streaming sounds or sounds in real-time during an electronic communication.

The processor or processing unit includes a processor and/or a digital signal processor (DSP). For example, the processing unit includes one or more of a central processing unit, CPU, digital signal processor (DSP), microprocessor, microcontrollers, field programmable gate arrays (FPGA), application-specific integrated circuits (ASIC), etc. for controlling the overall operation of memory (such as random access memory (RAM) for temporary data storage, read only memory (ROM) for permanent data storage, and firmware).

Consider an example embodiment in which the processing unit includes both a processor and DSP that communicate with each other and memory and perform operations and tasks that implement one or more blocks of the flow diagram discussed herein. The memory, for example, stores applications, data, programs, sound clips, algorithms (including software to implement or assist in implementing example embodiments) and other data.

For example, a processor or DSP executes a convolving process with the retrieved HRTFs or HRIRs (or other transfer functions or impulse responses) to process sound clips so that the sound is adjusted, placed, or localized for a listener away from but proximate to the head of the listener. For example, the DSP converts mono or stereo sound to binaural sound so this binaural sound externally localizes to the user. The DSP can also receive binaural sound and move its localization point, add or remove impulse responses (such as RIRs), and perform other functions.

For example, an electronic device or software program convolves and/or processes the sound captured at the microphones of an electronic device and provides this convolved sound to the listener so the listener can localize the sound and hear it. The listener can experience a resulting localization externally (such as at a sound localization point (SLP) associated with near field HRTFs and far field HRTFs) or internally (such as monaural sound or stereo sound).

The memory stores HRTFs, HRIRs, BRTFs, BRIRs, RTFs, RIRs, or other transfer functions and/or impulse responses for processing and/or convolving sound. The memory can also store instructions for executing one or more example embodiments. Further, the memory can store the sound, graphical representations, and other information and instructions discussed herein.

The electronic device provides sound to the users through one or more speakers. Alternatively or in addition to the speakers, the electronic device can communicate with headphones, earphones, earbuds, bone conduction devices, or another electronic device that provides sound to the user.

The networks include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

By way of example, a computer and an electronic device include, but are not limited to, handheld portable electronic devices (HPEDs), wearable electronic glasses, electronic or smart watches, wearable electronic devices (WEDs), smart earphones or hearables, electronic devices with cellular or mobile phone capabilities or subscriber identification module (SIM) cards, desktop computers, servers, portable computers (such as tablet and notebook computers), smartphones, head mounted displays (HMDs), optical head mounted displays (OHMDs), headphones, and other electronic devices with a processor or processing unit, a memory, a DSP.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Example embodiments can be executed with one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which the HPED (including headphones) includes a customized or dedicated DSP that executes one or more blocks discussed herein (including processing and/or convolving sound into binaural sound for sound clips). Such a DSP has a better power performance or power efficiency compared to a general-purpose microprocessor and is more suitable for a HPED or WED due to power consumption constraints of the HPED or WED. The DSP can also include a specialized hardware architecture, such as a special or specialized memory architecture to simultaneously fetch or pre-fetch multiple data and/or instructions concurrently to increase execution speed and sound processing efficiency and to quickly correct errors while sound externally localizes to the user. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller. The DSP can also prefetch sound clips and other sound from memory to expedite convolution.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider another example in which sound clips, graphical representations, and/or HRTFs (or other transfer functions or impulse responses) are stored or cached in the DSP memory or local memory relatively close to the DSP to expedite binaural sound processing.

As used herein, "customized HRTFs" or "HRTFs that are customized" are specific to an anatomy of a particular listener and are based on a size and/or shape of the head and/or ears of the listener.

As used herein, an "emoji" is a graphical representation that includes images, symbols, or icons sent between users in electronic communications (such as text messages, e-mail, and social media) to express an emotional attitude of the writer, convey information, or communicate an message. Emojis can provide sound when activated or executed.

As used herein, "empty space" is a location that is not occupied by a tangible object.

As used herein, "graphical representations" include, but are not limited to, emoji, emoticons, animoji, icons, stickers, folders, documents, files, text or words, pictures, images, and other visible indicia that display on, thru, or with an electronic device. Furthermore, these graphical representations can be two-dimensional (2D), three-dimensional (3D), virtual reality (VR) images, augmented reality (AR) images, static or non-moving, moving, and other types of images.

As used herein, "headphones" or "earphones" include a left and right over-ear ear cup, on-ear pad, or in-ear monitor (IEM) with one or more speakers or drivers for a left and a right ear of a wearer. The left and right cup, pad, or IEM may be connected with a band, connector, wire, or housing, or one or both cups, pads, or IEMs may operate wirelessly being unconnected to the other. The drivers may rest on, in, or around the ears of the wearer, or mounted near the ears without touching the ears.

As used herein, the word "proximate" means near. For example, binaural sound that externally localizes away from but proximate to a user localizes within three meters of the head of the user.

As used herein, a "sound localization point" or "SLP" is a location where a listener localizes sound. A SLP can be internal (such as monaural sound that localizes inside a head of a listener), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area. Further, in some instances, multiple impulse responses or transfer functions can be processed to convolve sounds to a place within the boundary of the SLP. In some instances, a SLP may not have access to a particular HRTF necessary to localize sound at the SLP for a particular user, or a particular HRTF may not have been created. A SLP may not require a HRTF in order to localize sound for a user, such as an internalized SLP, or a SLP may be rendered by adjusting an ITD and/or ILD or other human audial cues.

As used herein, "sound localization information" or "SLI" is information that is used to process or convolve sound so the sound externally localizes as binaural sound to a listener.

As used herein, a "telephone call," or a "electronic call" is a connection over a wired and/or wireless network between a calling person or user and a called person or user. Telephone calls can use landlines, mobile phones, satellite phones, HPEDs, voice personal assistants (VPAs), computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, Campus Area Networks or CANs, etc.). Telephone calls include other types of telephony including Voice over Internet Protocol (VoIP) calls, internet telephone calls, in-game calls, telepresence, etc.

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones in its ears or about six inches apart).

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

What is claimed is:

1. A method executed by one or more electronic devices, the method comprising:
receiving, during an electronic communication between a first user and a second user and at a microphone of a wearable electronic device (WED) of the first user, a voice of the first user;
processing, during the electronic communication and with a digital signal processor (DSP) in the WED of the first user, the voice of the first user with head-related transfer functions (HRTFs) to process the voice of the first user into binaural sound;
transmitting, during the electronic communication and over a wireless network, the voice of the first user in the binaural sound to a portable electronic device (PED) of the second user; and
playing, during the electronic communication and with the PED of the second user, the voice of the first user in the binaural sound that was convolved by the DSP in the WED of the first user such that the voice externally localizes to the second user in empty space away from a head of the second user.

2. The method of claim 1 further comprising:
receiving, at the PED of the second user and from the WED of the first user, a request for the HRTFs of the second user; and
transmitting, over the wireless network and in response to the request, the HRTFs of the second user from the PED of the second user to the WED of the first user.

3. The method of claim 1 further comprising:
determining, with the PED of the second user, that the first user is a friend of the second user; and
authorizing, by the PED of the second user, the WED of the first user to have access to the HRTFs of the second user in response to determining that the first user is the friend of the second user, wherein the WED of the first user and the PED of the second user are a head mounted display or electronic glasses.

4. The method of claim 1 further comprising:
reviewing, by the PED of the second user, privacy settings to determine whether the first user is authorized to have access to the HRTFs of the second user;
denying, in response to reviewing the privacy settings, the WED of the first user access to the HRTFs of the second user when the privacy settings indicate that the first user is not authorized to have access to the HRTFs of the second user; and
allowing, in response to reviewing the privacy settings, the WED of the first user access to the HRTFs of the second user when the privacy settings indicate that the first user is authorized to have access to the HRTFs of the second user.

5. The method of claim 1 further comprising:
determining, by the one or more electronic devices, whether the first user has authorization to access to the HRTFs of the second user; and
providing, by the one or more electronic devices, the WED of the first user with the HRTFs when the first user has the authorization to access the HRTFs of the second user.

6. The method of claim 1 further comprising:
displaying, with a display of the PED of the second user, privacy settings that enable the second user to select users other than the second user who have access to the HRTFs of the second user.

7. The method of claim 1 further comprising:
determining, during the electronic communication and with the PED of the second user, whether the first user is authorized to provide sound to the second user in the binaural sound;
playing, during the electronic communication and with the PED of the second user, the voice of the first user in the binaural sound when the first user is authorized to provide the sound to the second user in the binaural sound; and
changing, during the electronic communication and with the PED of the second user, the voice of the first user from being in the binaural sound to being in one of mono sound and stereo sound when the first user is not authorized to provide the sound to the second user in the binaural sound.

8. A non-transitory computer-readable storage medium that one or more electronic devices execute as a method, the method comprising:
obtaining, by an electronic device of a first user, head-related transfer functions (HRTFs) of a second user;
convolving, during an electronic communication between the first user and the second user and by a digital signal processor (DSP) in the electronic device of the first user, a voice of the first user with the HRTFs of the second user;
transmitting, during the electronic communication and from the electronic device of the first user to an electronic device of the second user, the voice of the first user in binaural sound that was convolved by the DSP with the HRTFs of the second user; and
playing, during the electronic communication and with the electronic device of the second user, the voice of the first user in the binaural sound that was convolved by the DSP with the HRTFs of the second user.

9. The non-transitory computer-readable storage medium of claim 8 further comprising:
saving, during the electronic communication, processing resources of a DSP in the electronic device of the second user by convolving the voice of the first user with the DSP in the electronic device of the first user before transmitting the voice of the first user to the electronic device of the second user, wherein the voice of the first user in the binaural sound externally localizes to the second user in empty space outside of a head of the second user.

10. The non-transitory computer-readable storage medium of claim 8 further comprising:
determining whether the first user is authorized play the binaural sound to the second user; and
changing the voice of the first user from being provided to the second user in the binaural sound to being provided to the second user in one of mono sound and stereo sound upon determining that the first user is not authorized to play the binaural sound to the second user.

11. The non-transitory computer-readable storage medium of claim 8 further comprising:
expediting playing of the voice of the first user to the second user at the electronic device of the second user by convolving the voice of the first user with the DSP in the electronic device of the first user before transmitting the voice of the first user to the electronic device of the second user, wherein the voice of the first user in the binaural sound externally localizes to the second user in empty space outside of a head of the second user.

12. The non-transitory computer-readable storage medium of claim 8 further comprising:
- determining whether the second user provided authorization to the first user to access the HRTFs of the second user;
- allowing access to the HRTFs of the second user upon determining that the second user provided the authorization; and
- denying access to the HRTFs of the second user upon determining that the second user did not provide the authorization.

13. The non-transitory computer-readable storage medium of claim 8 further comprising:
- determining whether the second user provided authorization for the first user to play the voice of the first user in the binaural sound to the second user;
- allowing the electronic device of the second user to play the voice of the first user in the binaural sound to the second user upon determining that the second user provided the authorization for the first user; and
- denying the electronic device of the second user to play the voice of the first user in the binaural sound to the second user upon determining that the second user did not provide the authorization for the first user.

14. The non-transitory computer-readable storage medium of claim 8, wherein the electronic device of the first user and the electronic device of the second user are one of a head mounted display and electronic glasses.

15. A method executed by one or more electronic devices during an electronic communication between a first user with an electronic device and a second user with an electronic device, the method comprising:
- processing, during the electronic communication and with a digital signal processor (DSP) in the electronic device of the first user, the voice of the first user with head-related transfer functions (HRTFs) of the second user;
- transmitting, during the electronic communication and from the electronic device of the first user to the electronic device of the second user, the voice of the first user already convolved by the DSP in the electronic device of the first user with the HRTFs of the second user; and
- playing, during the electronic communication and with the electronic device of the second user, the voice of the first user already convolved by the DSP in the electronic device of the first user with the HRTFs of the second user.

16. The method of claim 15 further comprising:
saving processing resources of a DSP in the electronic device of the second user since the voice of the first user is already convolved into binaural sound by the DSP in the electronic device of the first user, wherein the voice of the first user externally localizes to the second user in empty space at least one meter away from a head of the second user.

17. The method of claim 15 further comprising:
- determining, by the one or more electronic devices, that the first user is not authorized to play binaural sound to the second user; and
- changing, by the one or more electronic devices, the voice of the first user from being played to the second user in the binaural sound to being played in one of mono sound and stereo sound in response to determining that the first user is not authorized to play the binaural sound to the second user.

18. The method of claim 15 further comprising:
- receiving, at the electronic device of the second user, a request from the electronic device of the first user for access to the HRTFs of the second user;
- allowing access to the HRTFs of the second user in response to determining that the first user is authorized to have the HRTFs of the second user; and
- denying access to the HRTFs of the second user in response to determining that the first user is not authorized to have the HRTFs of the second user.

19. The method of claim 15 further comprising:
displaying, with a display of the electronic device of the second user, privacy settings that enable the second user to select which users other than the second user have access to the HRTFs of the second user.

20. The method of claim 15 further comprising:
displaying, with a display of the electronic device of the second user, privacy settings that enable the second user to select which users other than the second user have authorization to play binaural sound to the second user.

\* \* \* \* \*